US012354462B2

(12) United States Patent
Madden et al.

(10) Patent No.: US 12,354,462 B2
(45) Date of Patent: Jul. 8, 2025

(54) CONSOLIDATION OF ALERTS BASED ON CORRELATIONS

(71) Applicant: ObjectVideo Labs, LLC, Tysons, VA (US)

(72) Inventors: Donald Gerard Madden, Columbia, MD (US); Ethan Shayne, Clifton Park, NY (US)

(73) Assignee: ObjectVideo Labs, LLC, Tysons, VA (US)

( * ) Notice: Subject to any disclaimer, the term of this patent is extended or adjusted under 35 U.S.C. 154(b) by 87 days.

(21) Appl. No.: 18/221,437

(22) Filed: Jul. 13, 2023

(65) Prior Publication Data

US 2024/0021067 A1 Jan. 18, 2024

Related U.S. Application Data

(60) Provisional application No. 63/389,089, filed on Jul. 14, 2022.

(51) Int. Cl.

| | |
|---|---|
| ***G08B 23/00*** | (2006.01) |
| ***G08B 25/00*** | (2006.01) |
| ***G08B 29/02*** | (2006.01) |

(52) U.S. Cl.

CPC ........... *G08B 29/02* (2013.01); *G08B 25/001* (2013.01)

(58) Field of Classification Search

USPC .......... 340/500, 462, 488, 506, 515, 538.15, 340/539.22, 545.6, 555, 669, 691.2, 693.5

See application file for complete search history.

(56) References Cited

U.S. PATENT DOCUMENTS

| | | | |
|---|---|---|---|
| 6,661,340 | B1 | 12/2003 | Saylor et al. |
| 6,943,671 | B2 | 9/2005 | McGee et al. |
| 7,084,758 | B1 | 8/2006 | Cole |
| 7,113,090 | B1 | 9/2006 | Saylor et al. |
| 7,518,514 | B2 | 4/2009 | Bauchot et al. |
| 7,552,101 | B2 | 6/2009 | Bleines |

(Continued)

OTHER PUBLICATIONS developer.apple.com [online], "ActivityKit: Share live updates from your app as Live Activities in the Dynamic Island and on the Lock Screen.," on or before Aug. 3, 2022, retrieved on Oct. 13, 2023, retrieved from URL<https://developer.apple.com/documentation/activitykit>, 4 pages.

(Continued)

*Primary Examiner* — Daniel Previl

(74) *Attorney, Agent, or Firm* — Fish & Richardson P.C.

(57) ABSTRACT

Methods, systems, and apparatus, including computer programs encoded on computer storage media, for consolidation of alerts using a similarity criterion. One of the methods includes: receiving, from a sensor at a property for which a first action in a sequence of actions was detected by a second sensor at the property, data that identifies a second action at the property; determining whether the second action satisfies a similarity criterion for an action in the sequence of actions that define an event at the property; and in response to determining that the second action satisfies the similarity criterion for the action in the sequence of actions that define the event at the property, performing an event operation for the event at the property.

20 Claims, 4 Drawing Sheets

(56) References Cited

U.S. PATENT DOCUMENTS

| | | | |
|---|---|---|---|
| 7,821,386 B1 | 10/2010 | Barrett et al. | |
| 8,665,084 B2 | 3/2014 | Shapiro et al. | |
| 8,705,704 B2 | 4/2014 | Smith et al. | |
| 8,705,716 B2 | 4/2014 | Gregory | |
| 8,798,260 B2 | 8/2014 | Smith et al. | |
| 8,825,020 B2 | 9/2014 | Mozer et al. | |
| 8,855,830 B2 | 10/2014 | Imes et al. | |
| 8,988,215 B1 * | 3/2015 | Trundle | G08B 13/19602 340/539.11 |
| 9,054,893 B2 | 6/2015 | Elliot et al. | |
| 9,094,410 B2 | 7/2015 | Elliot et al. | |
| 9,098,279 B2 | 8/2015 | Mucignat et al. | |
| 9,119,038 B2 * | 8/2015 | Woods | H04W 4/021 |
| 9,131,040 B2 | 9/2015 | Elliot et al. | |
| 9,196,148 B1 | 11/2015 | Hutz | |
| 9,439,034 B2 * | 9/2016 | Lott | H04L 12/2825 |
| 9,514,630 B1 | 12/2016 | Steven | |
| 9,547,973 B1 | 1/2017 | Hutz | |
| 9,635,540 B2 | 4/2017 | Mullen | |
| 9,712,738 B2 * | 7/2017 | Van Heugten | H04N 23/959 |
| 10,026,300 B1 | 7/2018 | Hutz | |
| 10,706,714 B1 | 7/2020 | Hutz | |
| 11,417,199 B1 | 8/2022 | Hutz | |
| 2003/0128113 A1 | 7/2003 | Chang et al. | |
| 2008/0091932 A1 * | 4/2008 | Mcnutt | G05B 19/054 713/1 |
| 2009/0009326 A1 | 1/2009 | Veiga, III | |
| 2009/0066488 A1 | 3/2009 | Qiahe et al. | |
| 2009/0259572 A1 | 10/2009 | Lay et al. | |
| 2010/0217642 A1 | 8/2010 | Crubtree et al. | |
| 2010/0218108 A1 | 8/2010 | Crabtree et al. | |
| 2010/0295676 A1 | 11/2010 | Khachaturov et al. | |
| 2011/0169633 A1 | 7/2011 | Lauder et al. | |
| 2012/0173414 A1 | 7/2012 | Hoag | |
| 2013/0268353 A1 | 10/2013 | Zeto, III et al. | |
| 2014/0026094 A1 * | 1/2014 | Zimmerman | G06F 3/0481 715/781 |
| 2014/0091001 A1 | 4/2014 | Chan et al. | |
| 2014/0248910 A1 | 9/2014 | Dave et al. | |
| 2014/0253321 A1 | 9/2014 | Srinivasan et al. | |
| 2014/0365304 A1 | 12/2014 | Showers et al. | |
| 2018/0232787 A1 * | 8/2018 | Dupray | G06Q 30/06 |
| 2022/0375330 A1 * | 11/2022 | Hutz | G08B 25/016 |

OTHER PUBLICATIONS developer.apple.com, [online], "Managing notifications, " upon information and belief, available no later than May 2, 2022, retrieved on Jul. 5, 2023, retrieved from URL: <https://developer.apple.com/design/human-interface-guidelines/managing-notifications>, 4 pages.

developer.apple.com, [online], "Modifying content in newly delivered notifications," upon information and belief, available no later than May 2, 2022, retrieved on Jul. 5, 2023, retrieved from URL: <https://developer.apple.com/documentation/usernotifications/modifying_content_in_newly_delivered_notifications/>, 4 pages.

Edwards, Benj., "How to Quickly Turn off Annoying Notifications on iPhone or iPad," How-To Geek, Apr. 29, 2020, 7 pages.

User YSS, "Update existing notification with a badge, or by deleting previous notification," Apple, Inc. (Developer Forums), on or before 2016, 2 pages.

* cited by examiner

CONSOLIDATION OF ALERTS BASED ON CORRELATIONS

CROSS-REFERENCE TO RELATED APPLICATION

This application claims the benefit of U.S. Provisional Application No. 63/389,089, filed on Jul. 14, 2022, the contents of which are incorporated by reference herein.

BACKGROUND

Alerts from one or more devices can provide notifications or reminders of tasks or events that require a user's attention. Examples of alerts can include alerts for a text message, a phone call, an email, and a doorbell. Some alerts can include reminders that can remind the user of certain tasks or events. Some alerts can be from one or more devices in a residential property or a commercial property. For example, some alerts can be generated from a home monitoring system, an office security system, or a building intercom system.

SUMMARY

The disclosed systems, methods, and techniques generally relate to using a similarity criterion to identify multiple actions related to an overall event and providing consolidated alert for the overall event. A property monitoring system uses sensor data from one or more sensors to determine actions in a property. The property can be a residential property or a commercial property. The property monitoring system can determine to send an alert to a user device to provide notifications of the events.

An event can include a sequence of actions. One or more sensors of the property monitoring system can capture sensor data corresponding to the sequence of actions. The property monitoring system can perform analysis on the sensor data characterizing the multiple actions, and can generate multiple alerts for the sequence of actions. The multiple alerts can be redundant, and may be an incomplete or even misleading representation of what is actually happening. Sometimes, the multiple alerts can arrive within a short period of time, causing a distraction to a user of the property monitoring system who receives the multiple alerts from the user device.

This disclosed systems, methods, and techniques seeks to intelligently consolidate these individual notifications into a single alert which can be handled as one event. The system can determine whether two or more actions detected by one or more sensors satisfy a similarity criterion. If the two or more actions are likely correlated to the same event, the system can generate a combined alert for two or more actions, and the combined alert includes information that identifies the event defined by a sequence of actions that includes the two or more actions. This can reduce the amount of computing resources required by the property monitoring system because the property monitoring system need not continue to monitor the status of multiple alerts and whether an alert has been opened, resend an alert, or both. In some implementations, the combined alert can include updating a previously sent notification. The system can generate a combined video recording corresponding to the combined alert and the combined video recording can tell a more complete story of the overall event.

In general, one innovative aspect of the subject matter described in this specification can be embodied in methods that include the actions of receiving, from a sensor at a property for which a first action in a sequence of actions was detected by a second sensor at the property, data that identifies a second action at the property; determining whether the second action satisfies a similarity criterion for an action in the sequence of actions that define an event at the property; and in response to determining that the second action satisfies the similarity criterion for the action in the sequence of actions that define the event at the property, performing an event operation for the event at the property.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. Performing the event operation includes determining to skip providing an alert for the second action in the sequence of actions that define the event. The actions include receiving, from a third sensor at the property for which the first action in the sequence of actions was detected by the second sensor at the property, second data that identifies a third action at the property; determining whether the third action satisfies the similarity criterion for the action in the sequence of actions that define the event at the property; in response to determining that the third action does not satisfy the similarity criterion for the action in the sequence of actions that define the event at the property, determining that the third action is likely related to a second event at the property; and providing an alert a) for the second event at the property, and b) that includes data that indicates that the second event is a deviation from the event at the property. Determining whether the second action satisfies the similarity criterion for the action in the sequence of actions that define the event at the property including: predicting, for the sequence of actions, actions that likely happen after the first action; and determining whether the second action satisfies the similarity criterion for at least one action in the actions that likely happen after the first action. Determining whether the second action satisfies the similarity criterion for the action in the sequence of actions that define the event at the property including: obtaining, using the first action and from a database for a plurality of sequences of actions, data for the sequence of actions that identifies the event that is likely happening; and determining whether the second action satisfies the similarity criterion for the event.

The actions include in response to determining that the second action satisfies the similarity criterion for the action in the sequence of actions that define the event at the property, generating a combined alert that includes information that identifies both the first action and the second action. The event operation is determined using a user-defined setting. The actions include before receiving the data that identifies the second action: receiving, from the second sensor at the property, first data that identifies the first action at the property; determining that the first action is in the sequence of actions that define the event; and in response to determining that the first action is in the sequence of actions that define the event, determining to analyze one or more subsequent actions for inclusion in the sequence of actions. The actions include in response to determining that the first action is in the sequence of actions that define the event, providing an alert for the first action; and wherein in response to determining that the second action satisfies the similarity criterion for the action in the sequence of actions that define the event at the property, performing the event operation for the event at the property includes updating the previously provided alert for the first action to include information for the second action. The actions include in response to determining that the first action is in the sequence of actions that define the event, providing an alert for the first action; and wherein performing the event operation for the event at the property includes determining to skip providing an alert for the second action in response to providing the alert for the first action. The actions include in response to determining that the first action is in the sequence of actions that define the event, determining to currently skip providing an alert for the first action; and wherein in response to determining that the second action satisfies the similarity criterion for the action in the sequence of actions that define the event at the property, performing the event operation for the event at the property includes providing an alert for the event at the property. The actions include determining whether the second action satisfies the similarity criterion for the action in the sequence of actions that define the event at the property using a prediction model built on historical data obtained at the property. Determining whether the second action satisfies the similarity criterion for the action in the sequence of actions that define the event at the property includes determining whether the first action and the second action satisfy a correlation threshold.

The subject matter described in this specification can be implemented in various embodiments and may result in one or more of the following advantages. In some implementations, the systems and methods described in this specification can reduce computational resources used, e.g., memory, processor cycles, energy, or a combination of these, by generating a combined alert that includes information for multiple actions of the same event. In some implementations, the systems and methods described in this specification can reduce computational resources used by updating an existing alert for a first action to include information about a different, related action. In some implementations, the systems and methods described in this specification can provide a more accurate description of an overall event by presenting a combined alert that includes details about a sequence of actions that define the event. In some implementations, the systems and methods described in this specification can generate a combined alert that can provide less distraction for a user. In some implementations, the systems and methods described in this specification can provide different notification mechanisms based on the different types of combined events. For example, user devices can receive input from corresponding users which specifies a high priority notification, e.g., an alarm on the phone, should be displayed when someone passes through their front yard, but a low priority notification, e.g., an email notification, should be sent when a delivery person walks through the front yard and places a package by the door, and then leaves. In some implementations, the systems and methods described in this specification can determine the likely relationship between events. For example, the system can determine that events that happen coincidentally can be likely unrelated series of events, such as events related to someone working in the garden and someone delivering a package.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
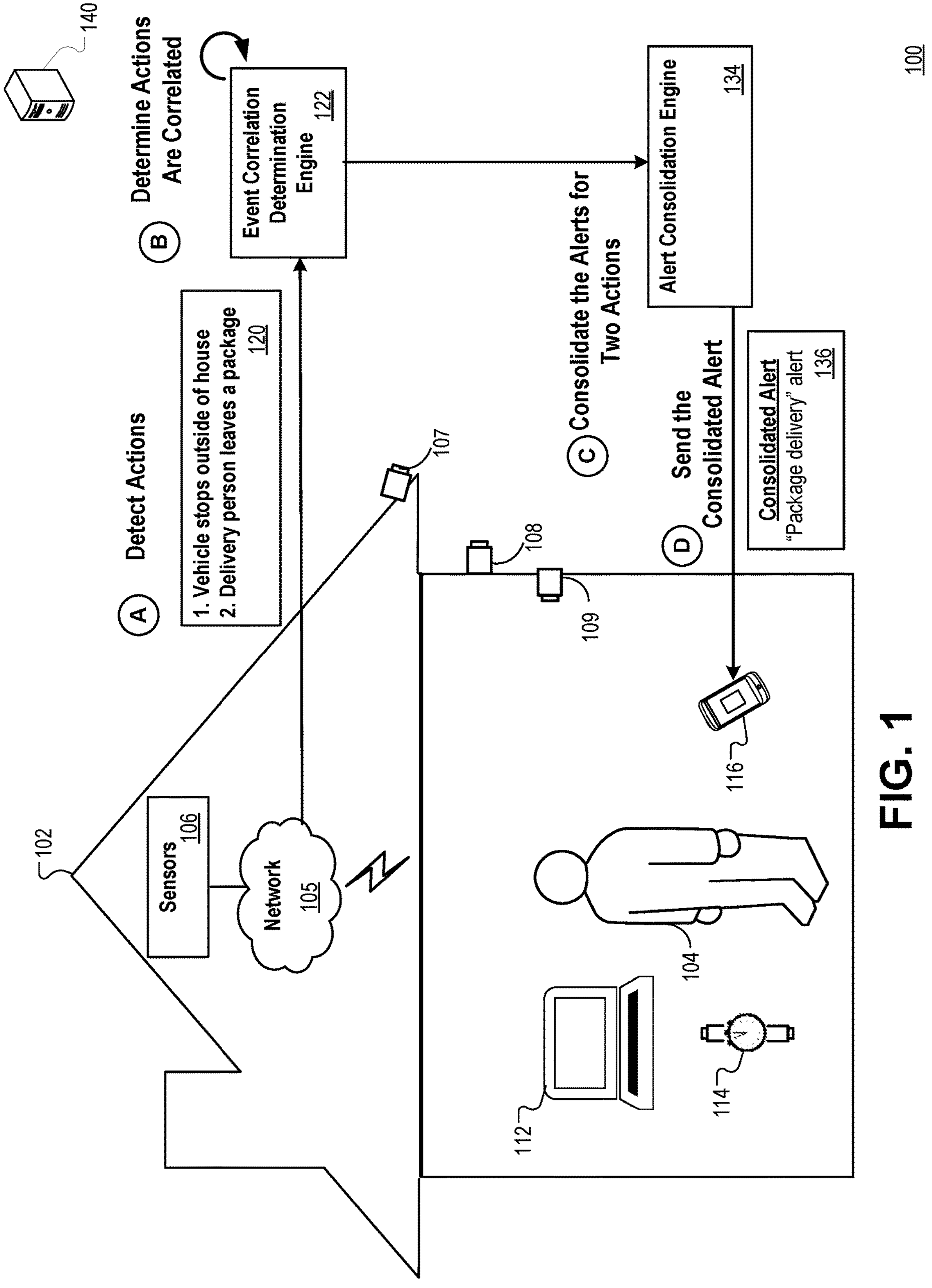
FIG. 1 is a diagram illustrating an example of an environment including a property monitoring system that consolidates alerts.

FIG. 1 is a diagram illustrating an example of an environment 100 including a property monitoring system 140 that consolidates alerts. The property monitoring system 140 includes one or more sensors 106 that monitor a property 102. The property 102 can be a residential property or a commercial property. For example, residents and homeowners can equip their properties with home security systems that have sensors 106 to enhance the security, safety, or convenience of their properties. Examples of the sensors 106 can include an audio sensor, a motion sensor, a camera, a light sensor, and other sensors at various locations throughout the property 102. For example, the sensors 106 can include a camera 108 at the front door, a camera 109 inside a room, and a camera 107 on the roof.

The sensors 106 can generate sensor data that can be used to determine actions at the property 102. For example, the camera 107 on the roof can capture video data of the road next to the house. The video data can include information characterizing a vehicle that stops outside of the house. The system can analyze the video data and can determine a first action "vehicle stops outside of house". The camera 108 at the front door can capture an image of the front porch of the house. The image can include information characterizing a package on the floor of the front porch of the house. The system can analyze the image data and can determine a second action "delivery person leaves a package". Thus, the system can determine the two actions 120 including the first action and the second action.

Sometimes, sending multiple alerts for the multiple detected actions can be redundant, and may be an incomplete or even misleading representation of what is actually happening. Sometimes, the multiple alerts can arrive within a short period of time, causing a distraction to a user of the property monitoring system who receives the multiple alerts from the user device.

For example, the first "vehicle stops outside of house" action can be redundant in view of the second "delivery person leaves a package" action. Thus, the system should just send one alert for the second "delivery person leaves a package" action, which can inherently include the first action. For example, a user device can receive two notifications for the two actions within a short period of time, e.g., 2 seconds. This could cause too much interruption or distraction to a user of the user device because the user might need to review and confirm each of the two notifications, unnecessarily use computational resources, or both.

To address these potential problems, a property monitoring system 140 can combine multiple alerts that relate to the same overall event or related sequence of actions. In some implementations, the system can receive a sequence of actions and trigger actions associated with an overall event. For example, a sequence of actions and trigger actions associated with a package delivery event could generate ten detected actions, or more. The camera 107 can detect from an image that a vehicle stops outside of the house, and the system can detect a possible "loiter" action using an image analytics rule on the camera 107. The camera 107, the camera 108, or both, can detect that a delivery person approaches the house, and the system can detect a "person on driveway" action using the image analytics rule on the cameras 107 and 108. As the delivery person approaches the front door, a motion sensor, e.g., a passive infrared sensor (PIR), could detect the motion or the movement of the delivery person. The detected motion could trigger the doorbell camera 108, and the system can detect a "person at front door" action using the image analytics rule on the doorbell camera 108.

When the delivery person rings the doorbell, a doorbell chime action can be triggered. When the delivery person leaves a package on the floor of the front porch, the system can generate a "package detected" action using the image analytics rule on the doorbell camera 108. As the delivery person walks back to the vehicle, the system can detect another "person on driveway" action using the image analytics rule on the cameras 107 and 108.

When the homeowner opens the front door, as the door unlocks, the property monitoring system can detect and log a "door open" action. When the home owner picks up the package, the system can detect a person and can detect that the package has been taken using the image analytics rule on the doorbell camera 108. When the vehicle leaves, the system can detect a "moving vehicle outside of house" action using the image analytics rule on the camera 107. When the homeowner closes the front door, the system can detect a "door closed and locked" action. Sending a notification for each of the ten detected actions would be unnecessary, redundant, and unnecessarily consume computational resources. A user could be frustrated if a flood of alerts arrive for the single package delivery event.

The sensors 106 may communicate the detected actions 120 over a network 105. The network 105 can be any communication infrastructure that supports the electronic exchange of data from the one or more sensors 106 to other devices or servers of the property monitoring system 140. For example, the network 105 may include a local area network (LAN). The network 105 may be any one or combination of wireless or wired networks and may include any one or more of Ethernet, Bluetooth, Bluetooth LE, Z-wave, ZigBee, or Wi-Fi technologies.

The system 140 can manage the detected actions 120. The system can include an event correlation determination engine 122 and an alert consolidation engine 134. The system can include, for example, one or more computer systems, server systems, or other computing devices that are located at the property 102, remotely from the property 102, or a combination of both. The system can be configured to process the detected actions 120 generated from the sensor data, and can determine whether one or more alerts can be consolidated. In some implementations, the system can include a cloud computing platform.

The system 140 can include an event correlation determination engine 122. The event correlation determination engine 122 can receive detected actions 120 generated from sensor data, and can determine whether the detected actions are correlated. In some implementations, the event correlation determination engine 122 continuously receives recently detected events, and can determine whether a recently detected action is correlated to one or more previously detected actions. The event correlation determination engine 122 can determine whether the detected actions 120 satisfy a correlation threshold using one or more of the analytic rules or models.

In some implementations, the event correlation determination engine 122 can determine a likely temporal relationship between the detected actions, e.g., temporal co-occurrence or temporal proximity of the detected actions. For example, using the timestamp of the sensor data, the event correlation determination engine 122 can determine whether the actions likely happen at or around the same time, whether one action likely follows another, or a combination of both. In some implementations, the event correlation determination engine 122 can learn the temporal relationship between common actions that typically follow each other. For example, from historical sensor data, the event correlation determination engine 122 can learn that a "delivery truck stops outside of house" action is often followed by a "delivery person leaves a package" action.

In some implementations, the event correlation determination engine 122 can determine a likely spatial relationship between the detected actions. For example, the event correlation determination engine 122 can determine the likely spatial relationship between the detected actions by determining the spatial relationship between the sensors, e.g., the cameras, that captured the sensor data for the detected actions. The event correlation determination engine 122 can determine whether the sensors are located near each other, e.g., within a threshold distance, having overlapping coverage areas, or both.

In some implementations, the likely spatial relationship between the detected actions can be learned from the temporal relationship between the sensor data captured by the sensors. For example, a first person is detected in a first image captured by a first camera and a second person is detected in a second image captured by a second camera. If the two images are captured at or around the same time, e.g., within a threshold time period, the event correlation determination engine 122 can determine that the detected first person and the detected second person are likely the same person.

In some implementations, the spatial relationship between the detected actions can be determined using configured locations of objects at the property or a map of the property. The property monitoring system 140, e.g., the event correlation determination engine 122, can use the configured locations of various objects at the property to determine whether actions related to those objects are related. For instance, when a camera is installed, the property monitoring system 140 can obtain the physical location of the camera. The property monitoring system 140 can determine the physical location of the camera on a floorplan map or a GPS coordinate of the camera. The property monitoring system 140 can calibrate the camera so that the system can correlate a pixel location of an image captured by the camera to a physical location. For instance, the property monitoring system 140 can obtain an image using camera B and the property monitoring system 140 can determine that a target object A at a pixel coordinate (X,Y) on the image relates to physical position C, e.g., middle of the driveway. The property monitoring system 140 can determine that a target object D at a pixel coordinate (V, W) on another camera E relates to a physical position F, e.g., the far edge of the front porch. The property monitoring system 140 can determine whether the target object A relates to the target object D using the distances between the physical positions C and F, people who interact with the two objects, e.g., actions for the two objects, or a combination of both.

In some implementations, the event correlation determination engine 122 can determine whether the detected actions likely involve the same object by performing cross-sensor object tracking. The object can be a person, an animal, a vehicle, etc., detected at the property. For example, the event correlation determination engine 122 can perform cross-camera target tracking to determine whether the same person is likely involved in two detected actions using the appearance of the person in the images captured by two cameras. In some implementations, the event correlation determination engine 122 can determine whether the detected actions likely involve the same object by performing cross-sensor object tracking and by determining the spatial relationship, temporal relationship, or both, between the detected actions. The cross-sensor object tracking can be augmented by known or learned spatial-temporal relationships between the sensors or the sensor data.

In some implementations, the sensors can capture data for multiple objects at the property. The event correlation determination engine 122 can perform cross-sensor object tracking for each of the multiple objects. Therefore, the system can generate a consolidated alert for each object based on tracking each object across sensor data of multiple sensors.

In some implementations, the event correlation determination engine 122 can perform cross-sensor object tracking for the group of the multiple objects. Therefore, the system can generate a consolidated alert for the group of objects based on tracking the group across sensor data of multiple sensors. For example, a first camera 107 can detect a first person at a first time. A second camera 108 can detect that the first person interacts with a second person at a second time. The third camera 109 can detect the second person at a third time. The event correlation determination engine 122 can determine whether to perform cross-camera person tracking for each person, or perform cross-camera person tracking for the group of the two persons, by analyzing the sensor data. The property monitoring system can then consolidate alerts for actions related to each person or the group of two persons using a result of the determination.

In some implementations, the learned correlations from the cross-camera object tracking can be used to determine the likely correlation of actions that are detected by other sensors in which cross-sensor tracking is not available, e.g., non-video sensors. The actions detected by the other sensors can be included when the alert consolidation engine 134 later consolidates the actions.

In some implementations, the event correlation determination engine 122 can determine whether the detected actions are likely correlated using patterns of known activities. A pattern may represent a collection of related actions or may refer to a specific sequence of actions. The event correlation determination engine 122 may be configured to recognize patterns of activities that constitute a common event. In some implementations, the event correlation determination engine 122 can learn the patterns from historical sensor data capturing the common event. For example, the system may learn that each time the doorbell is rung, a similar group of actions precede it, follow it, or a combination of both. The similar group of actions can include: "vehicle stops outside of house", "person approaches house", "person approaches front door", and "person at the property answers the door" or "person leaves house". In some implementations, the event correlation determination engine 122 can receive a manually described pattern of a target event from a user device.

In some implementations, the event correlation determination engine 122 can create a prediction model that can be configured to predict a later action that follows an earlier action. For example, the event correlation determination engine 122 can create a prediction model for the "package delivery" action that can be configured to predict a "doorbell rung" action in response to determining a likely "person approaches house" action. In some implementations, a user device can receive input from a corresponding user which specifies different urgencies, priorities, and methods of notifications for these different activities or action types. The system 140 can determine to send an alert for the action immediately or determine to delay sending an alert or wait to combine the action with a later action using the different urgencies, priorities, and methods of notifications for these different activities or action types.

In some implementations, the event correlation determination engine 122 can determine whether the detected actions are likely correlated using a combination of two or more of the following: temporal relationship, spatial relationship, cross-sensor object tracking, patterns of activities, and other possible characteristics of the detected actions.

The system can include an alert consolidation engine 134. After determining the detected actions 120 are likely correlated, the alert consolidation engine 134 can receive data for the detected actions 120 generated from sensor data, and can consolidate the alerts for the two or more actions 120. The event correlation determination engine 122 can generate a consolidated alert 136 that combines the alerts for the two or more actions. For example, for the detected actions 120, the alert consolidation engine 134 can generate a consolidated alert 136 that includes a single "package delivery" alert. The consolidated alert 136 can include a message stating "package delivery".

The alert consolidation engine 134 can send the consolidated alert 136 to a user device. The user device can be a device that is connected with the property monitoring system 140 through the network 105. For example, the user device can be a cell phone 116, a smart watch 114, or a personal computer 112. The user device can include a commercial device, such as a display device of an office security system, or a server of a building intercom system. The user device can present the consolidated alert 136, e.g., on a display screen of the user device or audibly. In some implementations, the alert consolidation engine 134 can send the consolidated alert 136 to a console or a webserver that can be configured to present the consolidated alert 136, e.g., on a console interface or a webpage.

An example scenario of consolidating alerts using correlations works as follows. In the example scenario, reference is made to various components of the system 140. However, different components in the system 140, or other components not described with reference to FIG. 1, can perform the various stages described in the example scenario. In some implementations, each of the operations in stages (A), (B), (C), and (D) can be performed on a user device, a server, some other device, or a combination of these.

In stage (A), the system 140 detects two or more actions 120. For example, the system can detect a "vehicle stops outside of house" action and a "delivery person leaves a package" action. The actions 120 could be detected using sensor data acquired by one or more sensors 106 of the system 140.

In stage (B), the event correlation determination engine 122 determines whether the two or more actions 120 are likely correlated. The event correlation determination engine 122 can receive, through the network 105, data for the detected actions 120 from the sensors 106 or another computer that analyzes the sensor data. The event correlation determination engine 122 can determine whether the detected actions are likely correlated using one or more of the following: temporal relationship between the detected actions, spatial relationship between the detected actions, cross-sensor object tracking, patterns of activities, or other possible characteristics of the detected actions. In some implementations, other possible characteristics of the detected actions can include recognition of the same target object, e.g., the same person, across multiple actions, even if those actions don't fall under any of these other correlations. For example, the system can track a particular visitor for the duration of their visit and can send a notification of the tracking result. In some examples, the system can generate a daily summary of actions, e.g., generating a description of what happened using natural language processing of the detected actions.

For example, the event correlation determination engine 122 can determine that the two detected actions 120 are likely temporally close to each other. The event correlation determination engine 122 can determine that the two detected actions likely fit a "package delivery" prediction model that models the patterns of activities related to a "package delivery" action. Using the temporal correlation, the activity patterns, or both, the event correlation determination engine 122 can determine that the two detected actions 120 are likely correlated.

In stage (C), the alert consolidation engine 134 consolidates the alerts for the two detected actions 120. The alert consolidation engine 134 can receive the detected actions 120 that are likely to be correlated from the event correlation determination engine 122. The alert consolidation engine 134 can generate a consolidated alert 136 from the detected actions that are likely to be correlated. For example, the alert consolidation engine 134 can generate a "package delivery" alert 136.

In some implementations, the alert consolidation engine 134 can update an alert that has been previously sent to a user device. For example, a "possible package delivery" alert could be sent to a user device when a vehicle stops outside of a house. Subsequently, the system 140 could detect that the delivery person leaves a package at the front door. If the "possible package delivery" alert has not been acknowledged by the user device (e.g., may be a user of the user device was busy), the system 140, e.g., the alert consolidation engine 134, could change the "possible package delivery" alert to the "package delivery" alert because the system determines that this is likely a "package delivery" action. For instance, the alert consolidation engine 134 can determine that it is likely unnecessary to display the "possible package delivery" alert. The alert consolidation engine 134 can determine that it is likely unnecessary to display both the "possible package delivery" alert and the "package delivery alert". In some implementations, even if the original "possible package delivery" alert was acknowledged by the user device, the system 140 can still change the "possible package delivery" alert to the "package delivery" alert. This can occur when the original alert is still accessible by the user device, the original alert was stored in a log, or in other appropriate situations.

In some implementations, the alert consolidation engine 134 can remove an alert that has been previously sent to a user device. For example, a "package delivery" alert could be sent to a user device when the delivery person leaves a package. Subsequently, the system 140 could detect that the homeowner picks up the package. If the "package delivery" alert has not been acknowledged by the user device, the system 140, e.g., the alert consolidation engine 134, could remove the alert from the user device, could archive the alert, or both. Because the user has already picked up the package, the system 140 does not need to display the "package delivery" alert and does not need to have the user to acknowledge the alert.

In stage (D), the system 140, e.g., the alert consolidation engine 134, sends the consolidated alert 136 to a user device. The system 140 can send the alert to a user device that displays the alert.

In some implementations, the system can send a recording of sensor data, e.g., a video recording, corresponding to the consolidated alert 136 to the user device. Because the detected actions are consolidated into a single consolidated event, the system can generate a recording of the sensor data that represents the consolidated action, e.g., that includes data for each sub action in the consolidated event. A first sub action can include "vehicle stops outside of house" and a second sub action can include "delivery person leaves a package." In some implementations, the system can generate a video recording within the context of the overall event in order to tell a more complete story.

Conventionally, the sensors 106 can be configured to capture, for each detected action, a recording of the sensor data that has a predetermined length, has a minimum time interval between recordings, or both. For example, the camera sensor 107 can be configured to capture a 30 second video clip for the "vehicle stops outside of house" action. The doorbell camera sensor 108 can be configured to capture a 30 second video clip for the "delivery person leaves a package" action. The system 140 can send the two 30 second video clips to a user device when sending the two detected actions 120.

Instead of having fixed recording length and minimum time interval between the recordings, the system can merge the recordings for the detected actions and can generate a merged video recording. For example, the system can set the beginning and the ending of the merged video recording to provide sufficient overlap between the detected actions in the sequence. Instead of recording a video with a fixed length of 30 seconds for each detected action, the system can record and merge the videos to create a clip which shows the driver arrives, walks to the house (e.g., by cutting from camera 107 to camera 108 as the system 140 has the best view of the driver), leaves the package, and walks away. The merged video recording can also show the package being picked up by the homeowner. In some implementations, the merged video recording can include two or more subsections showing in split-screen multiple video clips that happen simultaneously. For example, the merged video recording can include a split-screen showing that the homeowner picks up the package and the driver drives away the vehicle.

The property monitoring system 140 is an example of a system implemented as computer programs on one or more computers in one or more locations, in which the systems, components, and techniques described in this specification are implemented. The user devices 112, 114, and 116 can include personal computers, mobile communication devices, and other devices that can send and receive data over a network 105. The network 105, such as a local area network ("LAN"), wide area network ("WAN"), the Internet, or a combination thereof, connects the user devices 112, 114, and 116, and one or more servers. The one or more servers can use a single server computer or multiple server computers operating in conjunction with one another, including, for example, a set of remote computers deployed as a cloud computing service.

The property monitoring system 140 can include several different functional components, including an event consolidation determination engine 122 and an alert consolidation engine 134. The event consolidation determination engine 122, or alert consolidation engine 134, or a combination of these, can include one or more data processing apparatuses, can be implemented in code, or a combination of both. For instance, each of the event consolidation determination engine 122 and alert consolidation engine 134 can include one or more data processors and instructions that cause the one or more data processors to perform the operations discussed herein.

The various functional components of the property monitoring system 140 can be installed on one or more computers as separate functional components or as different modules of a same functional component. For example, the components event consolidation determination engine 122 and alert consolidation engine 134 of the property monitoring system 140 can be implemented as computer programs installed on one or more computers in one or more locations that are coupled to each through a network. In cloud-based systems for example, these components can be implemented by individual computing nodes of a distributed computing system.

Figure 2:
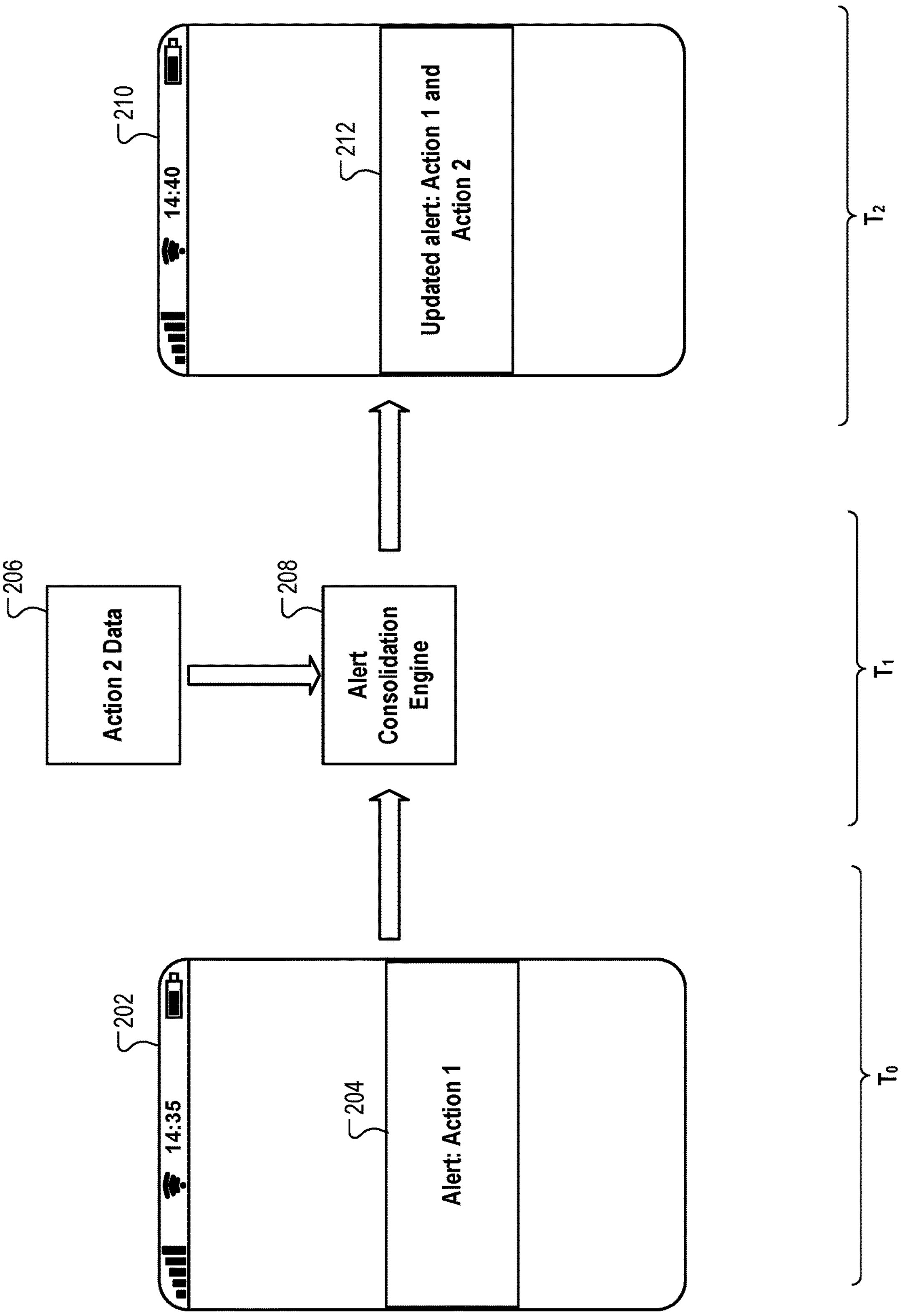
FIG. 2 is a diagram illustrating an example of consolidation of alerts.

FIG. 2 is a diagram illustrating an example of consolidation of alerts. FIG. 2 depicts an example user interface on a user device over a period of time, e.g., from a first time point $T_0$ to a third time point $T_2$. During a second time point $T_1$, the alert consolidation engine 208, e.g., the alert consolidation engine 134, can analyze data for multiple actions. The user interface can be a part of a security system application or another appropriate application. The user interface can be presented by a native application, e.g., executing on a particular operating system, a web application, or both, e.g., when an application includes both native and web versions.

At the first time point $T_0$, the user interface 202 displays an alert 204 for action 1. The alert for action 1 can be displayed as a box shown on the user interface 202, or any other possible formats. For example, the action 1 can be a detected action "vehicle stops outside of house". The system can send the alert 204 to the user device. The alert can include a message for action 1 and the message can be "Alert: Vehicle stops outside of house". After receiving the alert 204, the user device can display the alert 204 on the user interface 202.

At the second time point $T_1$, the system detects a second action. An alert consolidation engine 208 of the system can receive data 206 for action 2. For example, a camera sensor can capture a video for action 2: "delivery person leaves a package." The system can determine action 2 from the video. The data 206 of the action 2 can include a result of the detected action 2, a video recording of the action 2, or both. The alert consolidation engine 208 can determine to consolidate action 2 and action 1 if the system determines that the two actions are likely correlated. For example, the system can determine that the two actions are likely temporally and spatially correlated. Thus, the alert consolidation engine 208 can determine to combine the action 1 and the action 2 to generate a new alert or an updated alert for both actions. For example, the alert consolidation engine 208 can generate an update alert that includes data for, e.g., identifies for, both actions, e.g., both sub actions. The alert consolidation engine 208 can send the combined alert to the user device.

At the third time point, the user interface 210 displays the updated alert 212 received from the alert consolidation engine 208. The updated alert 212 can include a message for both actions. For example, the message can be "Updated alert: Vehicle stops outside of house and delivery person leaves a package." The updated alert 212 can be displayed as a box shown on a user interface, or any other possible formats. The user interface 210 no longer displays the alert 204 and the alert 204 can be removed from the user interface 210 because the updated alert 212 includes the information of the alert 204.

In some implementations, the system can display the updated alert 212 quietly, e.g., in order to avoid disturbance to the user of the device. For example, the updated alert 212 can quietly replace the original alert 204 without the phone making a new sound or vibration.

In some implementations, the alert can indicate that it is a consolidated alert. For instance, the alert consolidation engine 208 can generate an alert 212 that includes a predetermined identifier, e.g., phrase, image or other content, that identifies a consolidated alert. Some examples of predetermined phrases can include "updated alert", or "consolidated alert."

Figure 3:
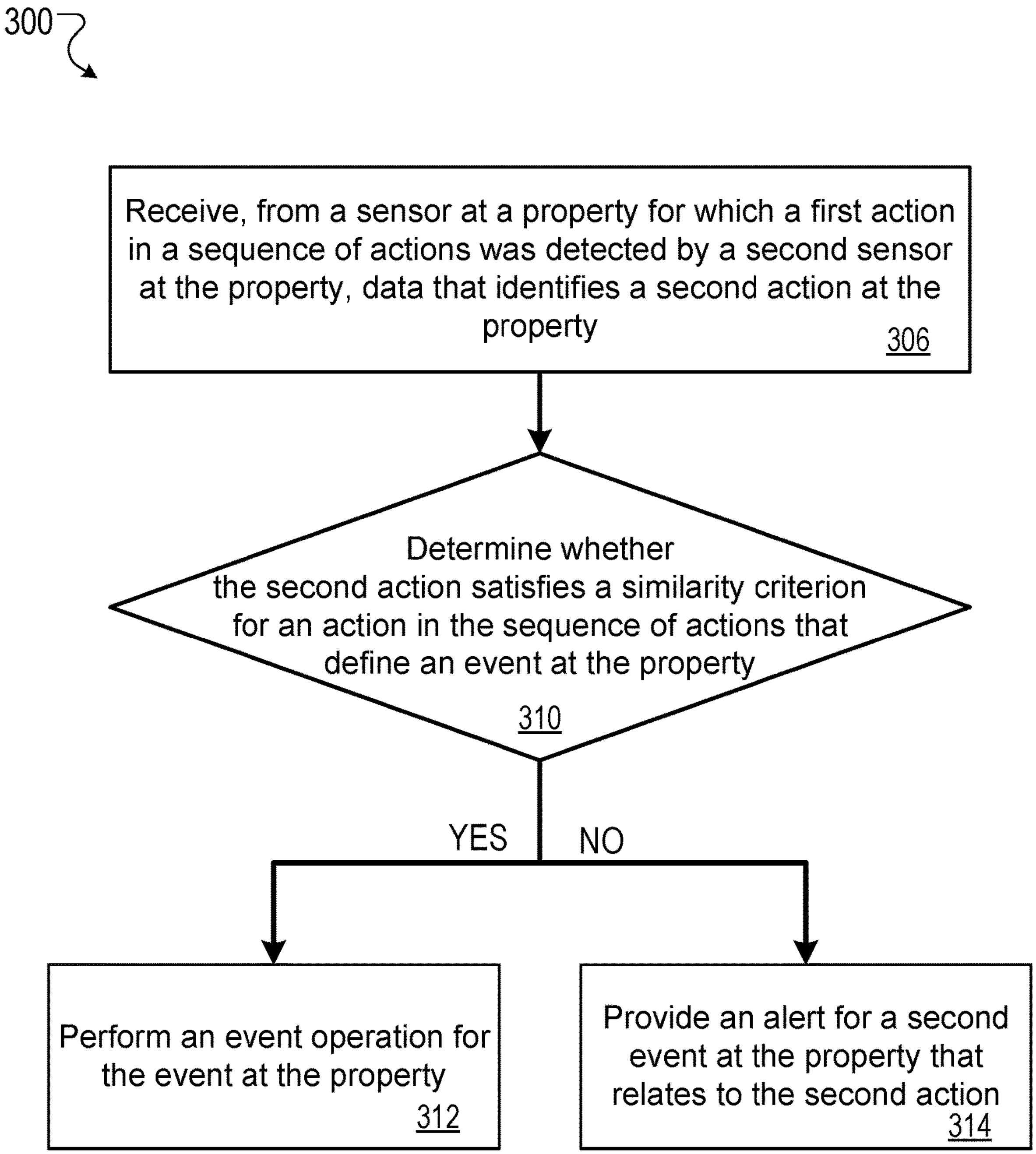
FIG. 3 is a flow chart illustrating an example of a process for consolidation of alerts using a similarity criterion.

FIG. 3 is a flow chart illustrating an example of a process 300 for consolidation of alerts using a similarity criterion. The process 300 can be performed by one or more computer systems, for example, a server, a portable electronic device (e.g., the laptop 112 or the phone 116), a control unit installed in a property, or a combination of these. In some implementations, some or all of the process 300 can be performed by the system 140, by another computer system located at the monitored property 102, at a remote location, or a combination of these.

The system receives, from a sensor at a property for which a first action in a sequence of actions was detected by a second sensor at the property, data that identifies a second action at the property (306). The sensor can be any appropriate type of sensor.

In some implementations, before receiving the data that identifies the second action, the system can receive, from the second sensor at the property, first data that identifies the first action at the property. The system can determine that the first action is in the sequence of actions that define the event. In response to determining that the first action is in the sequence of actions that define the event, the system can determine to analyze one or more subsequent actions for inclusion in the sequence of actions.

For example, the system can receive sensor data captured by the second sensor, and the sensor data can characterize the first action at the property. For example, the system can receive a video captured by a camera sensor at a house and the video can characterize a vehicle stopping in front of the property. For example, the system can receive motion data captured by a motion sensor at the front door of a house, and the motion data can characterize a possible motion of a person at the front door.

In some implementations, the system can determine to send a first alert that identifies the first action. The system can perform analysis on the first data using one or more data analytics rules. The system can perform an event detection algorithm on first data to detect the first action characterized in the second sensor data. For example, the system can perform an object detection algorithm on an image or a video captured by a camera sensor to detect persons, vehicles, or animals.

The system can perform an event detection algorithm to determine whether a detected object is likely performing an action related to a sequence of actions that define an event of interest. In some implementations, the system can predict an event that the first action is related to. In some implementations, the system can perform an activity-based or rule-based analysis on the first action to predict the event that the first action is likely related to or indicative of. For example, after determining that the first data characterizes that a vehicle stops outside of the house, the system can predict that the first action can be related to a "package delivery" event. The system can determine to send a first alert of "possible package delivery" that is related to the "vehicle stopping in front of house" event. In this example, the data that identifies the second action can be sensor data, e.g., image data, that identifies the delivery person walking toward a building on the property.

The system can determine whether the first action is in a sequence of actions that define an event of interest using a prediction algorithm or a predetermined rule. Given the above delivery related example, the sequence of actions can include: a) a vehicle stopping at a property, b) a delivery person approaching a package drop off location at the property, c) the package being left at the drop off location, d) the delivery person going back toward the vehicle, and e) the vehicle going away from the property.

For example, the system can determine whether the first action is likely of interest using one or more of the following: a confidence score of the detection of the first action, a priority of the first action, a severity of the first action, an urgency of the first action. The confidence score can indicate a likelihood that an action is sufficiently related to an action in the sequence of actions. For instance, the sequence of actions can include, as one action, "a delivery person approaching a package drop off location" while a detected action can be "a person jogging to a front entry of a building on the property." Although these actions might not be exactly the same, a system can determine a likelihood that the detected action is sufficiently similar to an action from the sequence of actions.

In some implementations, a user device can receive an input from a corresponding user which specifies one or more settings for a possible action to indicate whether the action is of interest, how to provide notifications, or a combination of both. For instance, the system might default to providing only one notification for a sequence of actions, instead of providing one notification for each action in the sequence of actions as might occur with other systems. By using the one or more settings, the system can determine whether to adjust the number of notifications for the sequence of actions, e.g., two notifications or some other number other than one notification for each action. In this way, the system can use the sequence of actions to determine notifications for presentation and, separately, the one or more settings to determine other notifications for presentation.

In response to determining that the first action is likely related to an event of interest, the system can determine to send a first alert that identifies the first action or in some cases, determine to currently skip providing an alert for the first action. For example, the first alert can include a message or an image that describes the first action. The first alert can include a video clip of the first action. In some implementations, the system can store the first alert on a server or a database of the system.

The system can send the alert at any appropriate time. In some implementations, after determining to send the first alert that identifies the first action, the system can send out the first alert immediately. In some implementations, after determining to send the first alert that identifies the first action, the system can determine to hold off sending the first alert until more information is obtained, until a predetermined period of time has passed, or a combination of both. The system can determine to hold off sending the first alert until the first alert is confirmed, e.g., using additional sensor data. The system can record the first data, e.g., a video clip, on the server, or the system can generate a log for the first action.

In some examples, the system can determine to send a first alert that identifies an event of "possible package delivery" after receiving first data indicating "vehicle stops outside of house". The system can determine to hold off sending the first alert until the "package delivery" event is confirmed. If further data, e.g., second data, indicates that a delivery person carries a package towards the front door, the system can determine that the event is confirmed and send out the first alert that identifies the package delivery event. If further data, e.g., second data, indicates that the driver turns around the vehicle or the driver goes back to the vehicle without coming towards the house, the system can determine that the event is not confirmed and archive the "possible package delivery" alert without delivering it to the user device.

In some implementations, the system can determine that the first action is likely not of interest, and the system can determine not to send an alert that identifies the event related to the first action. In some implementations, the system can determine to discard the first data of the first action. In some implementations, the system can determine to record all or part of the first data on a server of the system.

In response to determining that the first action is in the sequence of actions that define the event, the system can determine to analyze one or more subsequent actions for inclusion in the sequence of actions. For example, the system can receive sensor data captured by a sensor, and the sensor data can characterize a second action at the property. The sensor can be the same sensor as the second sensor. The sensor can be a different sensor from the second sensor, e.g., a roof camera 107 and a doorbell camera 108. The sensor can be a different type of sensor than the second sensor. For example, the sensor can be a camera sensor and the second sensor can be a motion sensor.

The second action can be an action that is related or not related to the first action. For example, the system can receive a video captured by a camera sensor at a house and the video can characterize a delivery person delivering a package after a related first action of "vehicles stop in front of house". In some examples, the system can receive a video captured by a camera sensor at a house and the video can characterize a landscaper starts mowing the lawn after an unrelated first action of "vehicles stop in front of house".

The system determines whether the second action satisfies a similarity criterion for an action in the sequence of actions that define an event at the property (310). For example, the sequence of actions that define an event can include an action of "person walks along the sidewalk". If the system receives data that identifies a second action of "person walks on the bike lane next to the sidewalk", the system can determine that the second action satisfies the similarity criterion. If the system receives data that identifies a second action of "person walks on the driveway", the system can determine that the second action does not satisfy the similarity criterion.

In some implementations, the system can predict, for the sequence of actions, actions that likely happen after the first action. The system can determine whether the second action satisfies the similarity criterion for at least one action in the actions that likely happen after the first action. For example, the system can predict that actions that likely happen after the first action of "a delivery vehicle arriving at the property" can include "a person walking across the driveway", "a person approaching the front door", "a person ringing the doorbell", etc. The system can determine that the second action of "the delivery person walking across the driveway" satisfies the similarity criterion for at least one action in the actions that likely happen after the first action of "a delivery vehicle arriving at the property".

In some implementations, the system can obtain, using the first action and from a database for a plurality of sequences of actions, data for the sequence of actions that identifies the event that is likely happening. The system can determine whether the second action satisfies the similarity criterion for the event. For example, the system can use the first action of "a delivery vehicle arriving at the property" to obtain data for a sequence of actions that identifies "a delivery event" that is likely happening. The system can determine whether a "delivery person walking on the driveway" action satisfies a similarity criterion for the "delivery event". For example, the system can determine that the "delivery person walking on the driveway" action is part of the sequence of actions for the "delivery event". The system can start sending notifications, e.g., based on a user-defined setting, the amount of certainty of the predicted event or action, or a combination of both.

In some implementations, the system can determine whether the second action satisfies the similarity criterion for the action in the sequence of actions that define the event at the property using a prediction model built on historical data obtained at the property. For example, the system can use a statistical model to determine whether there is high correlation between two actions.

In some implementations, determining whether the second action satisfies the similarity criterion for the action in the sequence of actions that define the event at the property can include determining whether the first action and the second action satisfy a correlation threshold. For example, the system can perform analysis on the first action and the second action, e.g., to determine whether the actions are likely correlated by determining whether the first event and the second event satisfy a correlation threshold. For instance, the system can determine, for the first event and the second event, one or more of: a temporal correlation, a spatial correlation, cross sensor object tracking, activity-based analysis, other possible action relationship analysis algorithms, or a combination of these. The system can determine a correlation score that represents the relationship between the first action and the second action using one or more of the above identified metrics, algorithms, or both. The system can compare the correlation score with the correlation threshold. For example, the correlation threshold can indicate whether the correlation score between the first action and the second action is larger than, equal to, or either, a predetermined threshold value.

In response to determining that the second action satisfies the similarity criterion for the action in the sequence of actions that define the event at the property, the system performs an event operation for the event at the property (312). In some implementations, the system can create an event memory structure for the event operation. For example, the system can be a system of a local camera and the system can perform the event operation as an in-memory process. In some implementations, each event can correspond to an entry in a database and the event operation can be an event-based database driven operation.

In some implementations, performing the event operation can include determining to skip providing an alert for the second action in the sequence of actions that define the event. For example, the second action can be "a delivery person at the front door" and the system can determine to skip providing an alert for the second action because the system already notified the user of the overall package delivery event determined based on the first action.

In some implementations, the event operation can be determined using a user-defined setting. The system can use the user-defined setting to determine how to deliver an alert of the event. In some cases, a customer may provide a user-defined setting for early warning when a package delivery shows up and the system can update the alert for the package delivery event as soon as a first action in the sequence of action is received. In some cases, a customer may provide a user-defined setting that specifies that an alert is only needed after a package has been delivered. The system can determine to skip sending alerts for those earlier actions and determine to only send an alert when the package is dropped off. The system can determine to continue to skip sending alerts after the package is dropped off, e.g., skip sending an alert when the delivery person walks back to the delivery truck.

In some implementations, in response to determining that the first action is in the sequence of actions that define the event and before receiving the data that identifies the second action, the system can provide an alert for the first action. Then, in response to determining that the second action satisfies the similarity criterion for the action in the sequence of actions that define the event at the property, the system can update the previously provided alert for the first action to include information for the second action. In some implementations, the system can update the previously provided alert for the first action to include information for both the first action and the second action.

For example, the system may have already sent the first alert that identifies the first action. In response to determining that the first action and the second action satisfy a correlation threshold, the system can update the first alert that identifies the first action. For example, after determining that the second action of "delivery person leaves a package" is related to the first action of "vehicle stops outside of house", the system can update the first alert of "possible package delivery" to an alert of "package delivery" because the system determines that the two actions are likely related to "package delivery".

In some implementations, in response to determining that the first action is in the sequence of actions that define the event and before receiving the data that identifies the second action, the system can provide an alert for the first action. Then, in response to determining that the second action satisfies the similarity criterion for the action in the sequence of actions that define the event at the property, the system can determine to skip providing an alert for the second action in response to providing the alert for the first action. For example, the first action can be "a doorbell press" and the system can determine to skip providing an alert for a subsequent, e.g., second, "package delivery" action because the user has already been notified of the "package delivery event" given the doorbell press, e.g., the user likely already heard the doorbell.

In some implementations, in response to determining that the first action is in the sequence of actions that define the event and before receiving the data that identifies the second action, the system can determine to currently skip providing an alert for the first action. Then, in response to determining that the second action satisfies the similarity criterion for the action in the sequence of actions that define the event at the property, the system can provide an alert for the event at the property.

The alert, e.g., notification, can include any appropriate type of information. In some implementations, the alert for the event at the property can be agnostic to any particular one action of the sequence of actions at the property. In some implementations, the alert can include information for a subset of the actions in the sequence of actions, but not all the actions in the sequence of actions. In some implementations, the alert can include information for all of the actions in the sequence of actions.

In some implementations, in response to determining that the second action satisfies the similarity criterion for the action in the sequence of actions that define the event at the property, the system can generate a combined alert that includes information that identifies both the first action and the second action. The combined alert can be, for example, the consolidated alert previously described in connection with FIG. 1 and FIG. 2. For example, the system can send a combined alert that includes a first message of "vehicle stops outside of house" and a second message of "delivery person leaves a package."

In response to determining that the second action does not satisfy the similarity criterion for the action in the sequence of actions that define the event at the property, the system can provide an alert for a second event at the property that relates to the second action (314).

For example, the system can receive, from a third sensor at the property for which the first action in the sequence of actions was detected by the second sensor at the property, second data that identifies a third action at the property. The system can determine whether the third action satisfies the similarity criterion for the action in the sequence of actions that define the event at the property. In response to determining that the third action does not satisfy the similarity criterion for the action in the sequence of actions that define the event at the property, the system can determine that the third action is likely related to a second event at the property. The system can provide an alert a) for the second event at the property, and b) that includes data that indicates that the second event is a deviation from the event at the property.

In some examples, in response to determining that the first action and the second action do not satisfy a correlation threshold, the system can generate the first alert, the second alert, or both. In some implementations, the system can generate the first alert and the second alert in separate steps. In some implementations, the system can generate only one of the first alert and the second alert. In some implementations, the system can generate the first alert and the second alert in any possible order.

In some examples, the system can predict an event that is related to the first action, and after determining the first action and the second action do not satisfy the similarity criterion for the action in the sequence of actions that define the event, the system can determine that the predicted event is not likely to be correlated to the second action. The system can determine that the second action has deviated from the event and the system can determine to correct or retract the first alert that identifies the predicted event, send an additional alert, or both. For example, the system may have already sent an alert indicating a "possible package delivery" event. The second action can identify that the driver walks around the back of the house after delivering the package. In response to determining the second action is not related to the "possible package delivery" event, the system can determine to send an additional alert indicating a "suspicious person at the back of the house" event because the action of the driver does not fit the sequence of predicted actions of a package delivery event.

In some implementations, the system can receive multiple actions that are related to an event that lasts more than a threshold period of time. For example, an event of a landscaper mowing the lawn could last several hours. The system can be configured to issue periodic or occasional updates to a combined alert for the lawn mowing event, to record that the activity was on-going, or both. These updates can include an alert that is sent to the user device in a silent mode without interrupting the user. These updates can include an alert that is recorded on the system without sending to a user device. For example, the system can add to a "lawn mowing event" new imagery to track the progress of the law mowing.

In some implementations, a detected subsequence action that deviates from the expected actions of a previously identified event can trigger a new alert. For example, the system can receive data that identifies the landscaper getting inside the basement of the house, and the system can determine to send an alert notifying the unusual activity of the landscaper.

In some implementations, the system can receive data that identifies the long lasting event has ended or completed and the system can determine to send an alert that identifies the activity has ended. For example, the system can receive data that identifies that the landscaper is leaving in their vehicle, or the system can receive data that lacks continued evidence that the lawn mowing is continuing, e.g., the landscaper left the view of any cameras on the lawn and has not returned for a threshold amount of time.

In some implementations, after sending an alert that identifies the activity has ended, the system can receive data that identifies that the activity is resumed within a threshold period of time. The system can determine to generate a new consolidated alert or can generate an update to the original alert. For example, after sending an alert that identifies that the lawn mowing activity has ended, the system can receive data that identifies that the landscaper resumed lawn mowing within the threshold period of time, e.g., 10 minutes. If the user has acknowledged the alert that identifies the end of the lawn mowing activity, the system can send a new consolidated alert indicating that the lawn mowing activity has resumed. If the user has not acknowledged the alert that identifies the end of the lawn mowing activity, the system can generate an update to the alert, e.g., by retracting the alert that identifies the end of the lawn mowing activity.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

Figure 4:
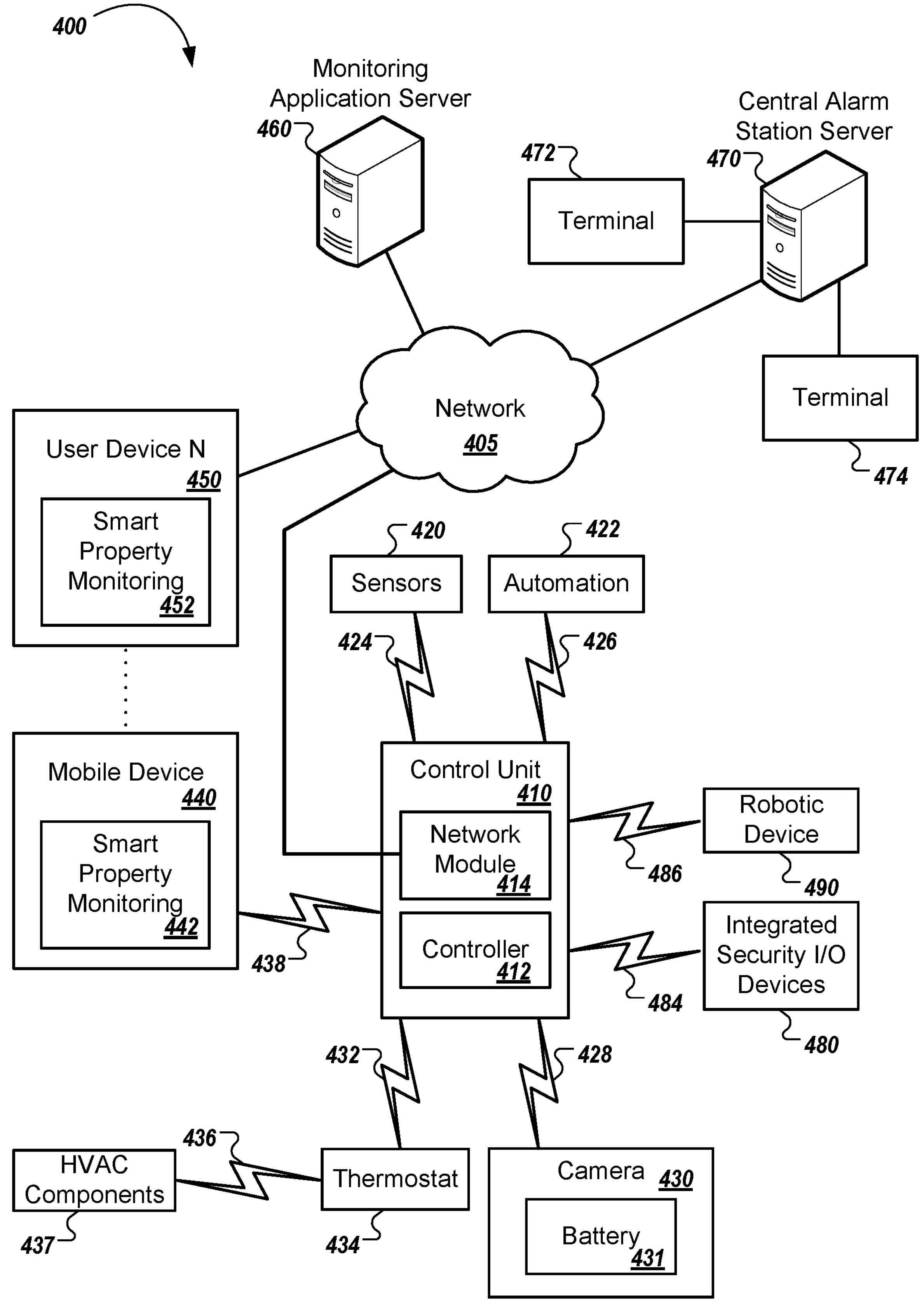
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at a predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "HomePlug" or other "Powerline" networks that operate over AC wiring, and a Category 5 (CATS) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone, iPod touch, Blackberry, Google Android, Windows Mobile, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method, comprising:

maintaining first sensor data indicating that a first action in a sequence of actions was detected by a first sensor at a property;

determining that second sensor data indicates that a second action at the property was detected by a second sensor at the property, wherein the first sensor data is different data than the second sensor data;

determining whether the second action satisfies a similarity criterion for an action in the sequence of actions that a) include the first action and b) define an event at the property; and in response to determining that the second action satisfies the similarity criterion for the action in the sequence of actions that a) include the first action and b) define the event at the property, performing an event operation for the event at the property.

2. The method of claim 1, wherein performing the event operation comprises determining to skip providing an alert for the second action in the sequence of actions that define the event.

3. The method of claim 1, comprising:

receiving, from a third sensor at the property for which the first action in the sequence of actions was detected by the first sensor at the property, second data that identifies a third action at the property;

determining whether the third action satisfies the similarity criterion for another action in the sequence of actions that define the event at the property;

in response to determining that the third action does not satisfy the similarity criterion for the other action in the sequence of actions that define the event at the property, determining that the third action is likely related to a second, different event at the property; and providing an alert a) for the second, different event at the property, and b) that includes data that indicates that the second, different event is a deviation from the event at the property.

4. The method of claim 1, wherein determining whether the second action satisfies the similarity criterion for the action in the sequence of actions that define the event at the property comprising:

predicting, for the sequence of actions, actions that likely happen after the first action; and determining whether the second action satisfies the similarity criterion for at least one action in the actions that likely happen after the first action.

5. The method of claim 1, wherein determining whether the second action satisfies the similarity criterion for the action in the sequence of actions that define the event at the property comprising:

obtaining, using the first action and from a database for a plurality of sequences of actions, data for the sequence of actions that identifies the event that is likely happening; and determining whether the second action satisfies the similarity criterion for the event.

6. The method of claim 1, comprising:

in response to determining that the second action satisfies the similarity criterion for the action in the sequence of actions that define the event at the property, generating a combined alert that includes information that identifies both the first action and the second action.

7. The method of claim 1, wherein the event operation is determined using a user-defined setting.

8. The method of claim 1, comprising, before receiving the data that identifies the second action:

receiving, from the first sensor at the property, first data that identifies the first action at the property;

determining that the first action is in the sequence of actions that define the event; and in response to determining that the first action is in the sequence of actions that define the event, determining to analyze one or more subsequent actions for inclusion in the sequence of actions.

9. The method of claim 8, comprising:

in response to determining that the first action is in the sequence of actions that define the event, providing an alert for the first action, wherein:

in response to determining that the second action satisfies the similarity criterion for the action in the sequence of actions that define the event at the property, performing the event operation for the event at the property comprises updating the previously provided alert for the first action to include information for the second action.

10. The method of claim 8, comprising:

in response to determining that the first action is in the sequence of actions that define the event, providing an alert for the first action; and wherein performing the event operation for the event at the property comprises determining to skip providing an alert for the second action in response to providing the alert for the first action.

11. The method of claim 8, comprising:

in response to determining that the first action is in the sequence of actions that define the event, determining to currently skip providing an alert for the first action, wherein:

in response to determining that the second action satisfies the similarity criterion for the action in the sequence of actions that define the event at the property, performing the event operation for the event at the property comprises providing an alert for the event at the property.

12. The method of claim 1, comprising determining whether the second action satisfies the similarity criterion for the action in the sequence of actions that define the event at the property using a prediction model built on historical data obtained at the property.

13. The method of claim 1, wherein determining whether the second action satisfies the similarity criterion for the action in the sequence of actions that define the event at the property comprises determining whether the first action and the second action satisfy a correlation threshold.

14. A system comprising one or more computers and one or more storage devices on which are stored instructions that are operable, when executed by the one or more computers, to cause the one or more computers to perform operations comprising:

receiving, from a sensor at a property for which a first action in a sequence of actions was detected by a second sensor at the property, data that identifies a second action at the property;

determining whether the second action satisfies a similarity criterion for an action in the sequence of actions that define an event at the property, wherein determining whether the second action satisfies the similarity criterion for the action in the sequence of actions that define the event at the property comprising:

obtaining, using the first action and from a database for a plurality of sequences of actions, data for the sequence of actions that identifies the event that is likely happening; and determining whether the second action satisfies the similarity criterion for the event; and in response to determining that the second action satisfies the similarity criterion for the action in the sequence of actions that define the event at the property, performing an event operation for the event at the property.

15. The system of claim 14, wherein performing the event operation comprises determining to skip providing an alert for the second action in the sequence of actions that define the event.

16. The system of claim 14, the operations comprise:

receiving, from a third sensor at the property for which the first action in the sequence of actions was detected by the second sensor at the property, second data that identifies a third action at the property;

determining whether the third action satisfies the similarity criterion for the action in the sequence of actions that define the event at the property;

in response to determining that the third action does not satisfy the similarity criterion for the action in the sequence of actions that define the event at the property, determining that the third action is likely related to a second event at the property; and providing an alert a) for the second event at the property, and b) that includes data that indicates that the second event is a deviation from the event at the property.

17. The system of claim 14, wherein determining whether the second action satisfies the similarity criterion for the action in the sequence of actions that define the event at the property comprising:

predicting, for the sequence of actions, actions that likely happen after the first action; and determining whether the second action satisfies the similarity criterion for at least one action in the actions that likely happen after the first action.

18. The system of claim 14, the operations comprise:

in response to determining that the second action satisfies the similarity criterion for the action in the sequence of actions that define the event at the property, generating a combined alert that includes information that identifies both the first action and the second action.

19. One or more non-transitory computer storage media encoded with instructions that, when executed by one or more computers, cause the one or more computers to perform operations comprising:

maintaining first sensor data indicating that a first action in a sequence of actions was detected by a first sensor at a property;

determining that second sensor data indicates that a second action at the property was detected by a second sensor at the property, wherein the first sensor data is different data than the second sensor data;

determining whether the second action satisfies a similarity criterion for an action in the sequence of actions that a) include the first action and b) define an event at the property; and in response to determining that the second action satisfies the similarity criterion for the action in the sequence of actions that a) include the first action and b) define the event at the property, performing an event operation for the event at the property.

20. The media of claim 19, the operations comprising, before receiving the data that identifies the second action:

receiving, from the first sensor at the property, first data that identifies the first action at the property;

determining that the first action is in the sequence of actions that define the event; and in response to determining that the first action is in the sequence of actions that define the event, determining to analyze one or more subsequent actions for inclusion in the sequence of actions.

* * * * *